(12) United States Patent
Park

(10) Patent No.: US 7,277,274 B2
(45) Date of Patent: Oct. 2, 2007

(54) KEYPAD OF PORTABLE WIRELESS TERMINAL AND FABRICATION METHOD THEREOF

(75) Inventor: Min-Ho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 10/714,602

(22) Filed: Nov. 18, 2003

(65) Prior Publication Data

US 2004/0165364 A1 Aug. 26, 2004

(30) Foreign Application Priority Data

Feb. 20, 2003 (KR) .................. 10-2003-0010736

(51) Int. Cl.
*G06F 1/16* (2006.01)
*H01H 13/70* (2006.01)

(52) U.S. Cl. ............. 361/680; 257/697; 343/702; 455/550.1

(58) Field of Classification Search ........ 361/679–682, 361/724–727; 257/677, 697; 341/22; 200/264; 343/702, 895; 400/481; 455/550.1, 557.1

See application file for complete search history.

(56) References Cited

U.S. PATENT DOCUMENTS

| | | | |
|---|---|---|---|
| 4,395,817 A | 8/1983 | Asada et al. | |
| 4,775,574 A | 10/1988 | Fukushima et al. | |
| 4,892,981 A * | 1/1990 | Soloway et al. | 200/5 A |
| 5,362,934 A | 11/1994 | Inagaki et al. | |
| 6,680,676 B1 * | 1/2004 | Hayashi et al. | 341/22 |
| 6,870,590 B2 * | 3/2005 | Shoji | 349/152 |
| 6,968,054 B2 * | 11/2005 | Park | 379/368 |

| | | | |
|---|---|---|---|
| 2004/0203495 A1 * | 10/2004 | Cheng et al. | 455/90.1 |

FOREIGN PATENT DOCUMENTS

| | | |
|---|---|---|
| CN | 1138170 A | 12/1996 |
| CN | 2400887 Y | 10/2000 |
| EP | 0 845 795 A2 | 6/1998 |
| EP | 1 102 292 A2 | 5/2001 |
| EP | 1 139 363 A2 | 10/2001 |
| JP | 06-267369 | 9/1994 |
| JP | 07-312137 | 11/1995 |
| JP | 08-050831 | 2/1996 |
| JP | 08-055534 | 2/1996 |
| JP | 10-162689 | 6/1998 |

(Continued)

OTHER PUBLICATIONS

Chinese Office Action dated Mar. 11, 2005.

(Continued)

*Primary Examiner*—Hung Van Duong
(74) *Attorney, Agent, or Firm*—Ked & Associates LLP

(57) ABSTRACT

A keypad of a portable wireless terminal includes a sheet having a plurality of holes, a plurality of keys inserted into respective ones of the holes, and a silicon adhesive layer on a lower surface of the sheet to fix the keys to the sheet. A protrusion at a lower surface thereof contacts a dome switch. The keys are firmly mounted at a precise position, and more beautiful design can be realized since a decoration line or a decoration shape can be easily formed to set an appearance of the keys.

39 Claims, 7 Drawing Sheets

FOREIGN PATENT DOCUMENTS

| | | |
|---|---|---|
| JP | 11-255928 | 9/1999 |
| JP | 2001345027 | 12/2001 |
| KR | 100302462 B1 | 7/2001 |
| KR | 1020020088179 A | 11/2002 |

OTHER PUBLICATIONS

Korean Office Action dated Mar. 28, 2005.

Official Action dated Oct. 31, 2005 in Japanese Patent Application No. 2004-39095.

European Search Report dated Mar. 27, 2006 in EP Application No. 03025728.1-2214.

* cited by examiner

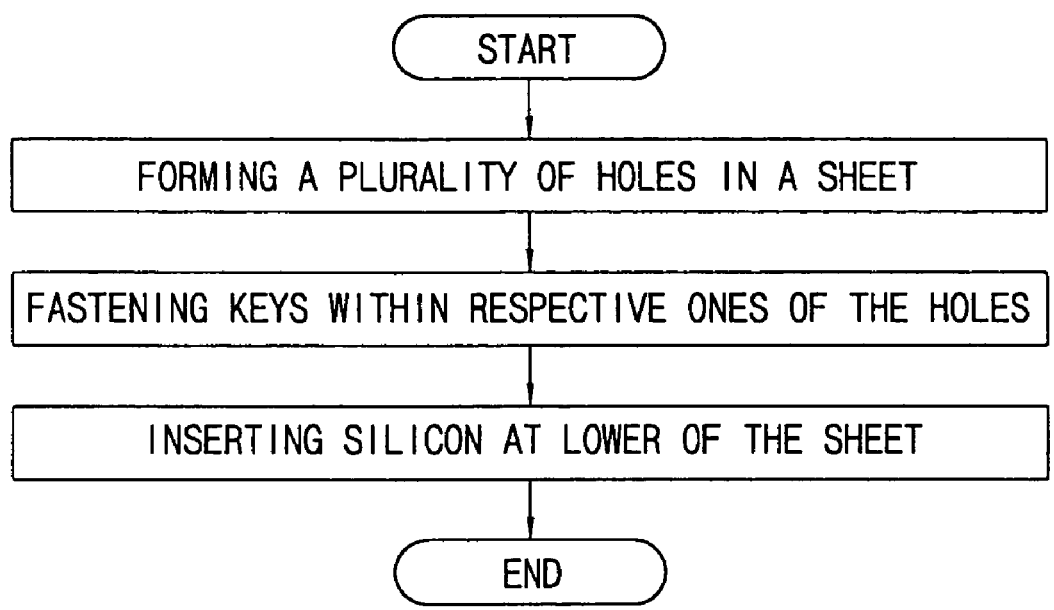

KEYPAD OF PORTABLE WIRELESS TERMINAL AND FABRICATION METHOD THEREOF

BACKGROUND OF THE INVENTION

1. Field of the Invention

The present invention generally relates to input devices, and more particularly to an input device for inputting information into an electronic system including but not limited to a portable wireless terminal. The present invention is also a method for a keypad of this type.

2. Background of the Related Art

Communication terminals generally include telephones commonly used in the home or office and portable wireless terminals. Portable wireless terminals have developed more functions as wireless communication techniques have evolved. These functions include voice transmission/reception, letter message transmission, data transmission, and image transmission/reception.

A keypad used as a switching device for generating input signals and setting various functions is used not only in general telephones but also in portable wireless terminals. Keypads of this type have keys on which numbers and letters are printed, and the keys are assembled in a front housing of the terminal in an operative state. The keypad is used to perform various functions, and is externally exposed thereby making its design, preference pattern, visual effect, and endurance very important.

FIG. 1 shows disassembled view of a portable wireless terminal. This terminal includes a folder 2 coupled to one side of a front case 1 by a hinge 3. A rear case 4 is also coupled to the front case. A printed circuit board 5 has contact points 5a arranged at an inner space formed between the front and rear cases. A dome switch assembly 6 is located adjacent the printed circuit board and a keypad made of a hard material is arranged on the dome switch assembly. The keypad is formed of a thin-film sheet 11 and keys 12 are formed on an upper surface of the sheet. The keys are inserted into respective holes 1a in the front case in such a manner that a part of each key is exposed to an outer portion of the terminal through the holes 1a.

FIG. 2 shows an isolated view of a related-art keypad which may be inserted into the portable wireless terminal shown in FIG. 1, and FIG. 3 is a sectional view taken along line A-A of FIG. 2. In the keypad, a dome switch 6 having an elastic force and a restoration force is mounted on the printed board 5, and keypad 10 having a key 12 formed on one part of sheet 11 is located adjacent the dome switch. A soft silicon material 13 is molded into the key.

The aforementioned keypad of the related art has a number of drawbacks. One drawback relates to the material from which keys of the keypad are made. As shown in FIGS. 2 and 3, each key of the keypad is made of a hard material, which makes its forming operation difficult and makes it difficult to change the key into various designs. That is, since a film of hard material is used to form each key, shapes of the keys are limited. For example, an edge part of each key is smashed which gives the key an ambiguous appearance. Also, since it is difficult to form a decoration line for beauty at the key surface, the appearance of the key is not beautiful.

FIG. 4 shows another related-art keypad for a portable wireless terminal, and FIG. 5 is a sectional view taken along line B-B of FIG. 4. In these figures, dome switch 6 is mounted on a printed circuit board 5 and a supporting member 23 of silicon material and having a protrusion 23a is located on the dome switch. A keypad 20 is installed on an upper surface of the supporting member, and a plurality of keys 22 of plastic material are attached to predetermined positions on an upper surface of a pad sheet 21 of the keypad using an adhesive (not shown).

The aforementioned related-art keypad also has a number of drawbacks. For example, when appearance is processed by spray painting and ultraviolet coating, the painting and coating are applied to an adhesion part of the keys. As a result, the keys do not adhere to the keypad completely but are shaken, or an adhesion position of the keys becomes deteriorated or distorted. Also, since heights of the keys are different from one another based on the amount of adhesive applied to fix each key to the pad sheet, each key has a different feeling or touch which thereby degrades reliability of the product. Also, since the keys are not in precise alignment with the key holes in the front case, quality of appearance is deteriorated and the user has a degraded pressing feeling for the keys.

SUMMARY OF THE INVENTION

An object of the invention is to solve at least one the above problems and/or disadvantages of the related-art keypads discussed above.

Another object of the present invention is to provide a keypad of an electronic device such as but not limited to a portable wireless terminal, in which keys are easily and firmly fixed in precise positions of a keypad and relative to key holes in a front housing of the terminal.

Another object of the present invention is to provide a keypad of an electronic device, such as but not limited to a portable wireless terminal, which has keys of uniform height in order to improve key tactility during use.

Another object of the present invention is to provide a method of making any one or more of aforementioned keypads.

To achieve these and other objects or advantages, the present invention provides a keypad of a portable wireless terminal comprising: a sheet in which a plurality of holes are perforated; a plurality of keys inserted into respective holes of the sheet; and a silicon adhesive layer adhered to a lower surface of the sheet s to fix the keys to the sheet and having a protrusion at a lower surface thereof in order to touch a dome switch. A stopping portion, protruding outwardly by being inserted into the sheet holes, is formed at a lower circumferential surface of the keys in order to be inserted into the holes of the sheet.

The present invention is also a method for fabricating a keypad of a portable wireless terminal comprising the steps of: punching-processing a plurality of holes at a file material of a sheet; inserting the keys into respective holes of the sheet; and forming a silicon adhesive layer at a lower surface of the sheet and thus fixing the keys to the sheet. The keys are inserted into the holes of the sheet by an insert injection molding method.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIG. 9 is a flow chart showing steps included in a method for making a keypad of a portable wireless terminal according to an embodiment of the present invention.

DETAILED DESCRIPTION OF PREFERRED EMBODIMENTS

Figure 1:
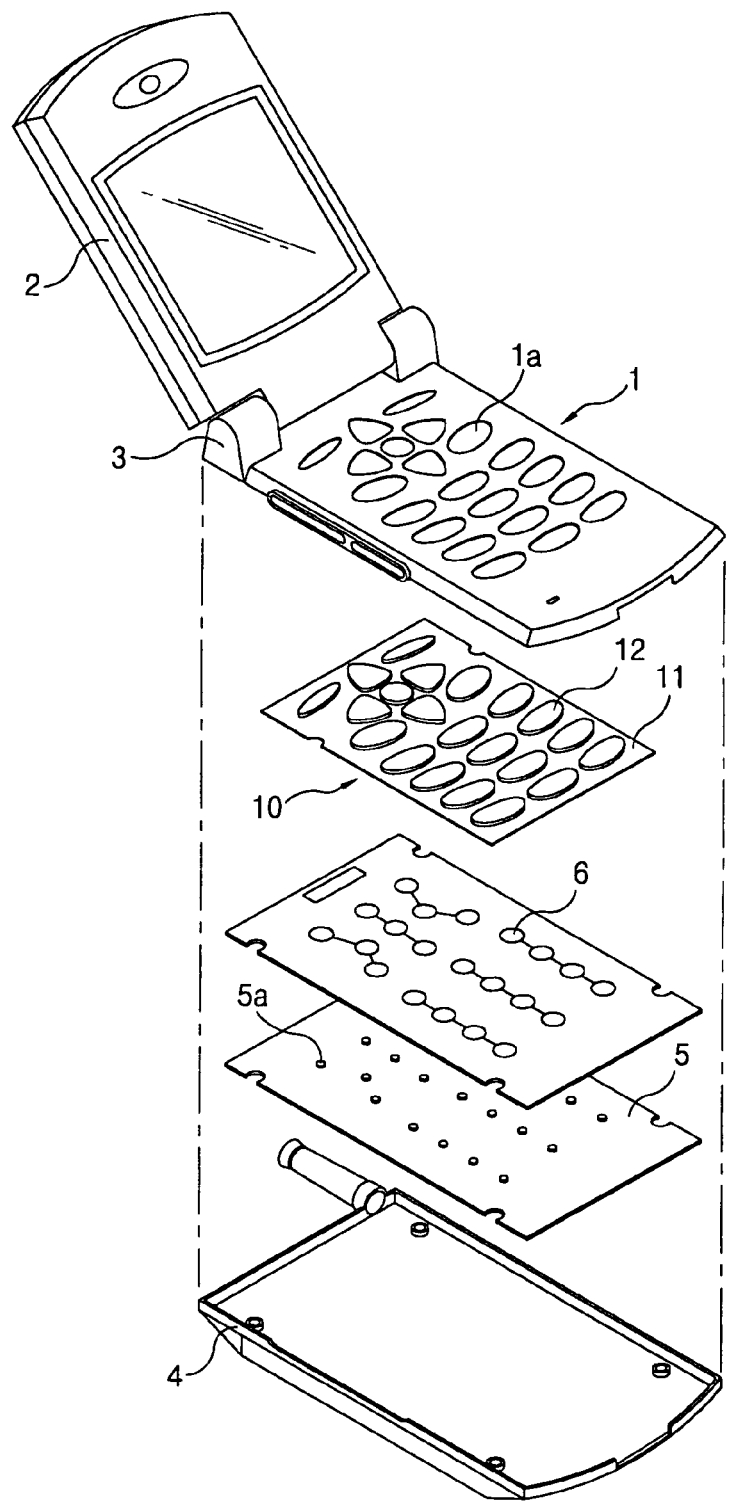
FIG. 1 is a disassembled view showing parts of a portable wireless terminal.
Figure 2:
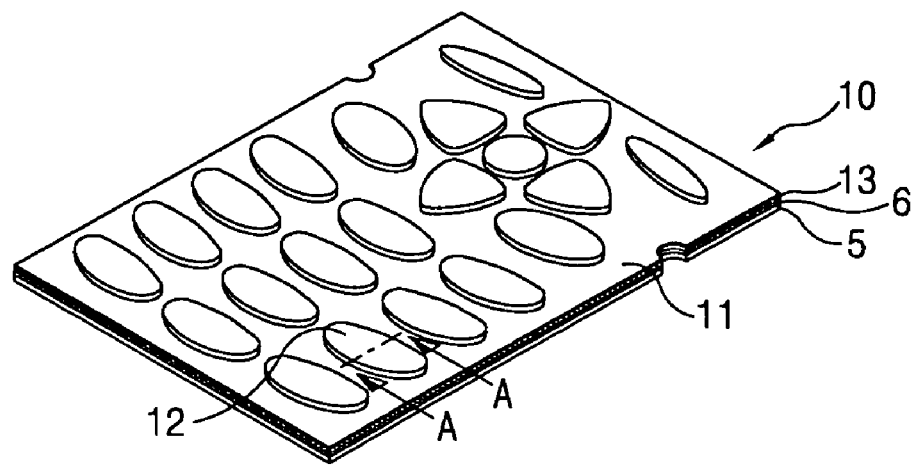
FIG. 2 is a view showing a related-art keypad which may be adapted for use in the portable wireless terminal of FIG. 1.
Figure 3:
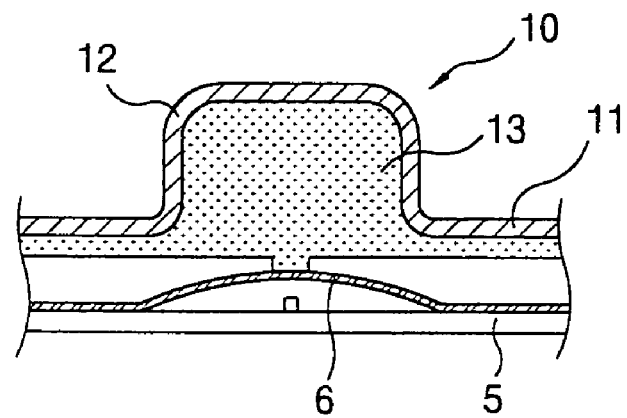
FIG. 3 is a sectional view taken along line A-A of FIG. 2.
Figure 4:
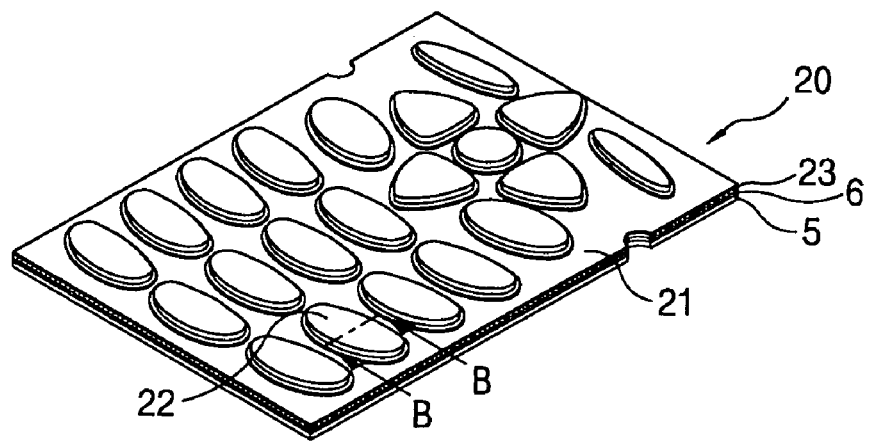
FIG. 4 is a view showing another related-art keypad which may be adapted for use in the portable wireless terminal of FIG. 1.
Figure 5:
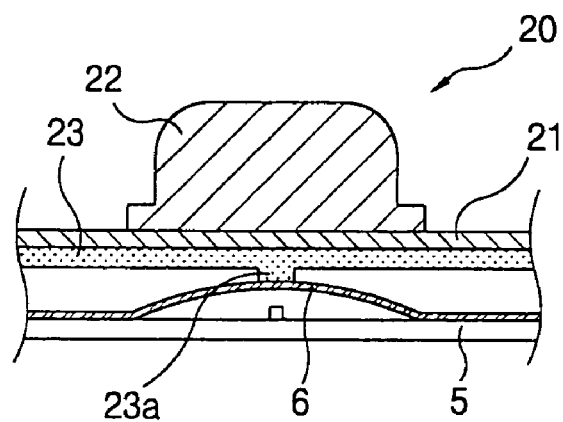
FIG. 5 is a sectional view taken along line B-B of FIG. 4.
Figure 6A:
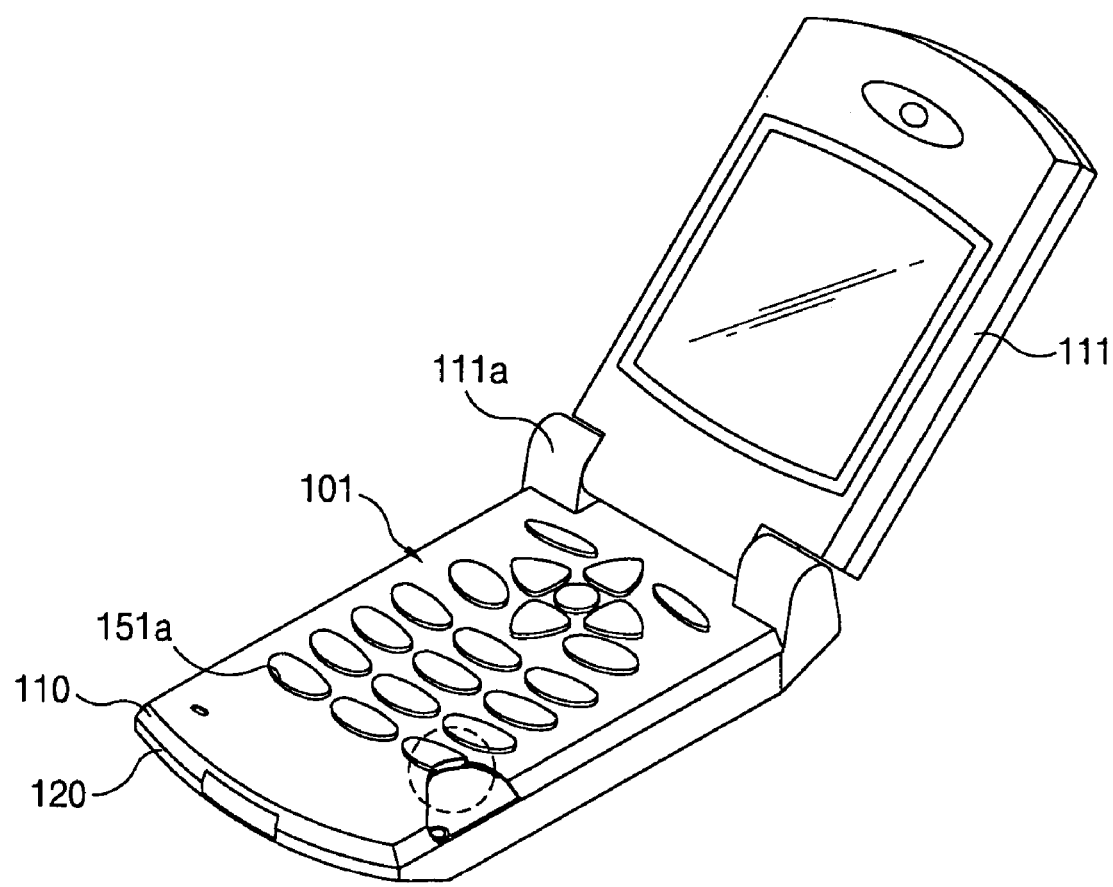
FIG. 6(A) is a perspective view showing a portable wireless terminal according to a preferred embodiment of the present invention.
Figure 6B:
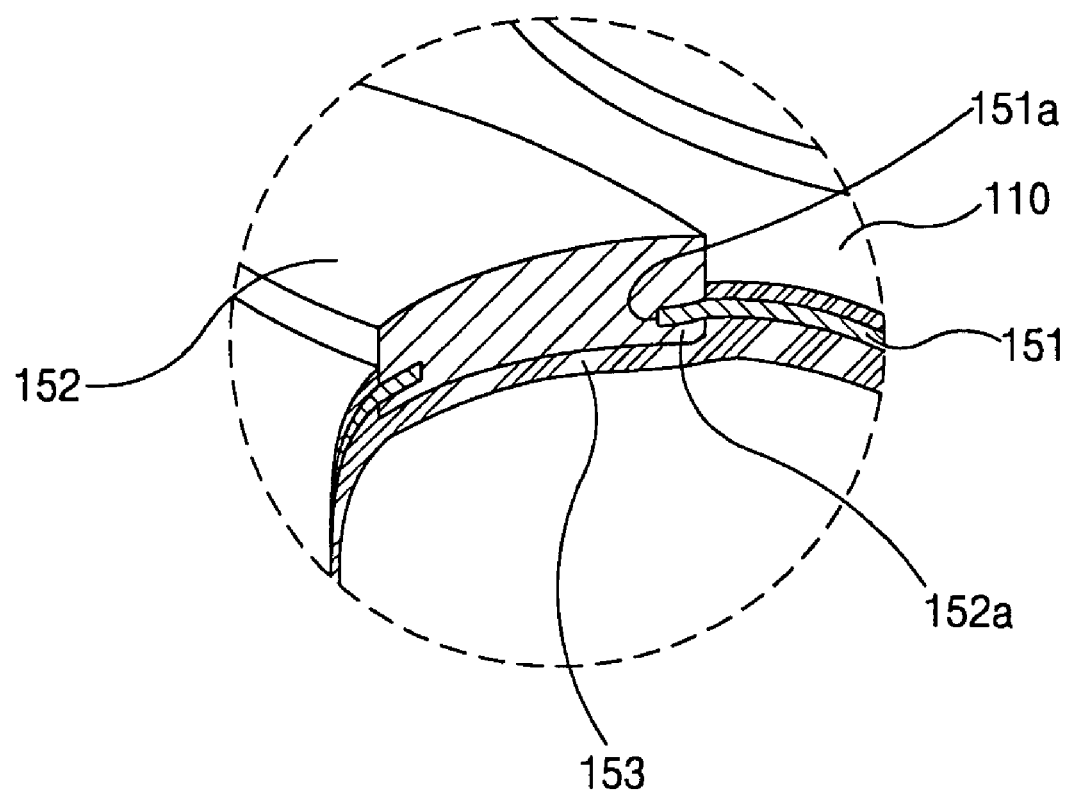
FIG. 6(B) is an exploded sectional view showing one portion of the keypad in the terminal of FIG. 6(A)
Figure 7:
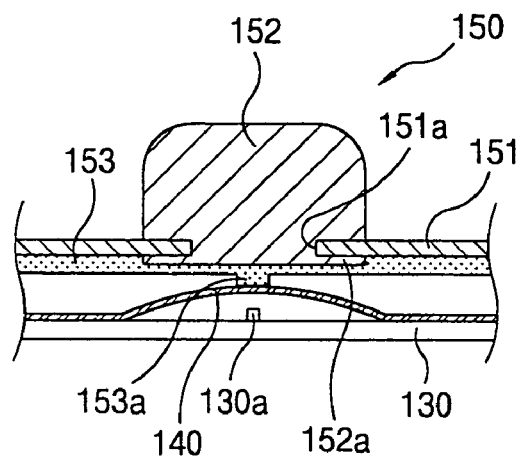
FIG. 7 is a longitudinal section view showing a keypad of the portable wireless terminal according to the present invention.

FIG. 6(A) is a view showing a portable wireless terminal according to a preferred embodiment of the present invention, FIG. 6(B) is an exploded sectional view of a portion of a keypad included in the terminal of FIG. 6(A), and FIG. 7 is a cross-sectional view of one key in the keypad shown in FIGS. 6(A) and 6(B). As shown, the terminal includes a folder 111 coupled to one side of a front case 110 by a hinge 111a, which allows the folder to be folded. A rear case 120 is coupled to the front case.

A printed circuit board 130 having a contact point 130a is located at an inner space formed between the front case and the rear case. A plurality of dome switches 140 are respectively arranged on the printed circuit board 130 and a keypad 150 includes keys 152 in alignment with respective ones of the dome switches.

A plurality of holes 151a are formed at an upper surface of a sheet 151 of the keypad. Keys 152, preferably made of a plastic material, are inserted and assembled into respective ones of the holes 151a using, for example, an insert injection-molding process. A stopping portion 152a is preferably formed at a lower portion of the keys 152. This stopping portion may be integrally formed with each key as a result of the injection-molding process.

For example, during injection molding a recess 180 may be formed in the key preferably along its outer surface. If desired, the recess may traverse a circumferential path around this. As shown in FIG. 6B, inner surfaces 186 and 187 may be provided above and below the recess contact portions of the sheet near each hole. This contact and more specifically the stopping portion 152a formed at least in part by surface 187 operates to hold the key firmly within the hole.

A adhesion layer 153, preferably made of silicon, is adhered to a lower surface of the sheet 151 and preferably to a periphery of stopping portion 152a. The adhesive layer, thus, provides an additional force for fixing the keys 152 into the holes of the sheet. A protrusion 153a is formed at a lower surface of the adhesion layer in order to touch or at least be in close proximity to the dome switches 140.

In the keypad of the portable wireless terminal of the present invention, if a user presses key 152 for generating a signal which, for example, corresponds to a dialed number or a specific terminal function, the protrusion 153a of the adhesion layer 153 presses against the dome switches 140. The dome switch deflects in response to this force, thereby touching a contact point 130a on the printed circuit board to initiate a desired operation.

As previously discussed, each key 152 of the keypad is firmly held within a respective hole 151a of the sheet by stopping portion 152a, which is preferably but not necessarily formed at a lower surface of the keys. The optional adhesive layer is adhered to a lower portion of the key and the sheet. In this position, the adhesive layer provides an additional force for fastening the keys to the holes in the sheet. Through the stopping portion and/or the adhesive layer, the keys in the keypad of the present invention are assured of being firmly fixed on the sheet and precisely located relative to the key holes in the terminal housing.

Figure 8:
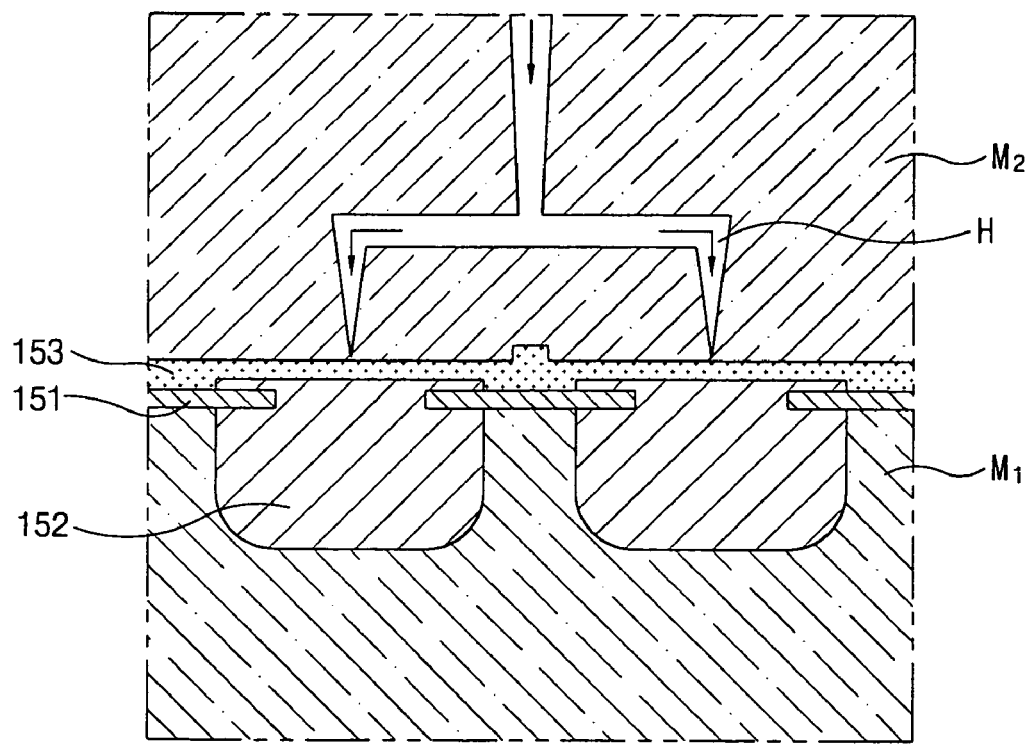
FIG. 8 is a view for explaining a pin-point gate method which may be used to form the keys of the keypad of the present invention.

FIG. 8 is a view explaining a pin-point gate method which is preferably used to form the keypad of the present invention. In a state where keys 152 are inserted into holes 151a of the sheet, the sheet is turned over between a lower metallic pattern M1 and an upper metallic pattern M2. An adhesive material (e.g., silicon) 153 is then injected into the lower portion of the keys through an injection opening H of the upper metallic pattern M2 in accordance with the pin-point gate method, thereby simultaneously and very rapidly assembling the keys onto the sheet.

FIG. 9 is a flow chart showing steps included in a method of making a keypad of a portable wireless terminal according to a preferred embodiment of the present invention. This method includes forming a plurality of holes in a sheet of preferably hard film material using, for example, a punching machine. The holes will accommodate one or more keys of the keypad, S210. Next, keys of preferably a plastic or rubber material are inserted into the respective holes of the sheet. This may be accomplished by an insert injection molding method, S220. The sheet is then turned over to assume a state where the keys are inserted into respective holes between a lower metallic pattern and an upper metallic pattern. Adhesive material is then injected into the lower portion of each key using a pin-point gate method, which preferably involves injecting the adhesive through more than two injection openings, thereby firmly mounting each key to the sheet.

In the first step S210, by using a punching machine, the plurality of holes are formed at predetermined positions in the sheet. In the second step S220, the keys are inserted into the holes of the sheet preferably using an insert injection-molding method, which allows the keys to be molded within the holds of the sheet. At this time, because the material which is injected into the sheet holes overlaps onto both sides of the portion of the sheet forming the holes, the recess and stopping portion previously discussed will be formed.

For reference, in the insert injection-molding method, composite components may be fabricated by integrating a workpiece in with resin. This is accomplished by putting or inserting the workpiece in the metallic pattern and then injecting the resin. The sheet of the present invention corresponds to the work piece.

The stopping portion of the keys formed by the insert injection molding method is advantageous because it prevents each key from being released from a respective hole of the sheet. The keys can be formed of plastic (resin), rubber, or another suitable material to suit the user's taste.

Unlike related-art keypads, in the keypad of the portable wireless terminal of the present invention keys are inserted into and held within holes of a sheet using a key molding metallic pattern. As a result, all keys of the keypad are formed simultaneously, using the pin-point method which involves injecting injection material through more than two injection openings. Accordingly, it is easy to form a decoration line or a decoration shape at the appearance of the keys when the keys are formed and thus a beautiful keypad can be formed.

In the third step S230, the adhesive layer of soft material is formed at the lower portion of the sheet in order to provide additional force for fixing the keys within the holes of the sheet. This minimizes the impact applied to the dome switches and thus improves pressing tactility. The adhesive layer can be formed by bonding according to a general adhesive agent or by a rubber metallic pattern or by another known technique. Also, it is preferable to include a step for spray post-processing the appearance of the keys to thereby enhance tactility of the keys according to the user's taste.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A keypad of a portable wireless terminal, comprising:
a sheet having a plurality of holes; and
a plurality of keys independently fastened within respective ones of the holes, wherein the keys are detached from one another and are supported by the sheet within a housing of the portable wireless terminal, wherein each key includes a recess for receiving a portion of the sheet near the hole, and wherein portions of the key located above and below the recess overlap and contact the portion of the sheet near the hole, and wherein the portion of each key located below the recess defines a stopping portion for holding the key within the hole.

2. The keypad of claim 1, wherein the keys include stopping portions which fasten the keys within respective ones of the holes.

3. The keypad of claim 2, wherein the stopping portions are integrally formed with the keys.

4. The keypad of claim 2, wherein the stopping portions and the keys are made from a same material.

5. The keypad of claim 2, wherein the stopping portions are located at lower surfaces of the keys.

6. The keypad of claim 1, wherein the plurality of keys are independently fastened within respective ones of the holes without an adhesive, said keys having a substantially uniform height.

7. The method of claim 6, wherein the adhesive layer includes a silicon material.

8. The keypad of claim 1, wherein the recess is a circumferential recess.

9. The keypad of claim 1, wherein the recess extends from an interior of the key to an outermost circumferential surface between the portions of the key that are above and below the recess.

10. The keypad of claim 1, wherein the stopping portion is located along a lowest surface of the key.

11. The keypad of claim 1, wherein the keys are formed of a plastic material.

12. The keypad of claim 1, wherein the sheet is substantially parallel to a front case of the portable wireless device.

13. The keypad of claim 1, wherein the keys protrude above a front case of the portable wireless device.

14. The keypad of claim 1, wherein said keypad further comprises:
another sheet including a plurality of dome switches aligned with respective ones of the keys; and
an adhesive layer coupled between the keys and dome switches,
wherein the adhesive layer includes a plurality of protrusions aligned with respective ones of the dome switches, each of the protrusions applying a force to close a respective one of the dome switches when one of the keys is pressed.

15. The keypad of claim 14, wherein the adhesive layer is adjacent a lower surface of the sheet and contacts lower surfaces of the keys, said adhesive layer providing additional force for holding the keys within the holes of the sheet.

16. The keypad of claim 15, wherein the adhesive layer includes a silicon material.

17. The keypad of claim 15, wherein the key and adhesive layer are made from different materials.

18. The keypad of claim 14, wherein the adhesive layer is substantially parallel to the sheet having the holes.

19. The keypad of claim 18, wherein the adhesive layer is also substantially parallel to a front case of the portable wireless terminal.

20. The method of claim 14, wherein the adhesive layer is substantially parallel to the sheet having the holes.

21. The method of claim 20, wherein the adhesive layer is also substantially parallel to a front case of the portable wireless terminal.

22. The keypad of claim 14, wherein the adhesive layer applies a force to hold the keys in the holes.

23. The method of claim 14, wherein each dome switch includes a curved metal surface which deflects to touch an electrical contact point coupled to a circuit board when pressure is applied to a respective one of the keys.

24. The keypad of claim 14, wherein each dome switch includes a curved metal surface which deflects to touch an electrical contact point coupled to a circuit board when pressure is applied to a respective one of the keys.

25. A method for fabricating a keypad of a portable wireless terminal, comprising:
forming a plurality of holes in a sheet; and
fastening a plurality of independent keys within respective ones of the holes, the keys being detached from one another and supported by the sheet within a housing of the portable wireless terminal, said fastening including:
inserting the keys into the holes by an insert injection molding method, each key being inserted by coupling a recess formed along a perimeter of the key to a respective one of the holes in the sheet, and wherein portions of each key above and below the recess overlap and contact a portion of sheet near a respective one of the holes.

26. The method of claim 25, further comprising:
forming the sheet so as to be substantially parallel to a front case of the portable wireless device.

27. The keypad of claim 26, wherein the adhesive layer is a substantially planar integral layer extending below the plurality of keys.

28. The method of claim 25, wherein the portion of each key below the recess defines a stopping portion for holding the key within the hole.

29. The method of claim 28, wherein the stopping portion is located along a lowest surface of the key.

30. The method of claim 25, wherein the keys are formed of a plastic material.

31. The method of claim 25, further comprising:
forming the keys using a pin-point gate method.

32. The method of claim 25, further comprising:
spraying the keys to enhance tactility of the keys.

33. The method of claim 25, wherein the keys are fastened to protrude above a front case of the portable wireless device.

34. The method of claim 25, wherein the recess is a circumferential recess.

35. The method of claim 25, wherein the recess extends from an interior of the key to an outermost circumferential surface between the portions of the key that are above and below the recess.

36. The method of claim 25, wherein the key and adhesive layer are made from different materials.

37. The method of claim 25, wherein the adhesive layer is a substantially planar integral layer extending below the plurality of keys.

38. The method of claim 25, wherein said method further comprises:
attaching another sheet including a plurality of dome switches in alignment with respective ones of the keys; and
forming an adhesive layer between the keys and the dome switches, the adhesive layer including a plurality of protrusions aligned with respective ones of the dome switches, each of the protrusions applying a force to close a respective one of the dome switches when one of the keys is pressed, wherein the adhesive layer applies a force to hold the keys in the holes.

39. A keypad, comprising:
a sheet having a plurality of holes;
a plurality of keys independently fastened within respective ones of the holes, wherein the keys are detached from one another and are supported by the sheet within a housing of the portable wireless terminal; and
an adhesive layer adjacent a lower surface of the sheet and contacting lower surfaces of the keys, said adhesive layer providing additional force for holding the keys within the holes of the sheet and including a plurality of protrusions aligned with respective ones of the keys, and
wherein each key includes a recess for receiving a portion of the sheet near the hole, portions of the key above and below the recess overlapping and contacting the portion of the sheet near the hole, and wherein the recess extends from an interior of the key to an outermost circumferential surface between the portions of the key above and below the recess, the portion of the key below the recess defining a stopping portion having a lower surface coincident with a lower surface of the key.

* * * * *